(12) United States Patent
Hyer

(10) Patent No.: US 6,903,282 B2
(45) Date of Patent: Jun. 7, 2005

(54) WEIGHING SCALE

(75) Inventor: Frank S. Hyer, Duxbury, MA (US)

(73) Assignee: Hyer Industries, Inc., Pembroke, MA (US)

( * ) Notice: Subject to any disclaimer, the term of this patent is extended or adjusted under 35 U.S.C. 154(b) by 306 days.

(21) Appl. No.: 10/237,211

(22) Filed: Sep. 5, 2002

(65) Prior Publication Data

US 2004/0045746 A1 Mar. 11, 2004

(51) Int. Cl.[7] .......................... G01G 21/02; G01G 3/14; G01G 23/01
(52) U.S. Cl. ....................................... 177/256; 73/1.13
(58) Field of Search .......................... 177/256, DIG. 9; 73/1.13

(56) References Cited

U.S. PATENT DOCUMENTS

| | | | |
|---|---|---|---|
| 2,961,231 A | 11/1960 | Kucera | 265/71 |
| 3,477,533 A | 11/1969 | Hyer et al. | 177/220 |
| 3,599,739 A | 8/1971 | Hyer | 177/211 |
| 4,023,634 A * | 5/1977 | Provi et al. | 177/211 |

* cited by examiner

Primary Examiner—Randy W. Gibson
(74) Attorney, Agent, or Firm—Lahive & Cockfield, LLP

(57) ABSTRACT

A scale having a load platform suspended by multiple horizontally spaced suspension members. Tensions on the suspension members apply torques to a load transfer linkage comprising a plurality of horizontally extending, torsionally rigid torque transfer members arranged for additive transfer of the torques to a lever counterbalancing and indicating device. Equality of the torque arms at all connections of the suspension members to the rigid members is achieved by allowing the suspension members to extend substantially vertically and to bear with minimal lateral forces on calibrating sleeves of predetermined uniform and equal diameters received on the rigid members.

4 Claims, 2 Drawing Sheets

WEIGHING SCALE

BACKGROUND OF THE INVENTION

This invention relates generally to scales suitable for industrial applications such as batch weighing and loss-of-weight metering of particulate solid materials ranging from highly fluid powders to corrosive chemicals and abrasive ores. More particularly, the invention relates to an improvement in the stability of calibration of weighing suspension scales under variable shock and overloading conditions, varying positions of loads on the scale, and deformation of support structures.

U.S. Pat. No. 3,477,533 issued to the present applicant and Peter J. Tolan, dated Nov. 11, 1969, describes suspension weighing apparatus of a type that has come into wide use. A load platform in the form of a hopper having a valve, gate or volumetric feeding element at the bottom is suspended on a load transfer linkage by a first set of vertically hanging suspension members such as wire rope cables. The linkage includes a pair of torsionally rigid torque transmitting members which are in turn suspended from a fixed support frame by a second set of vertically hanging fulcrum suspension members. The axes of suspension of the first set of suspension members are spaced from the axes of suspension of the second set of suspension members, forming torque arms, whereby the load on platform applies torques to the horizontal members. The torque transmitting members have attached equalizing lever arms arranged to transfer the torque on one member additively to that on the other. The linkage of the torque transmitting members thus completed is counterbalanced by means including a load cell that applies and indicates a force proportional to the sum of the torques applied through the suspension members.

For acceptable reliability in use of the scale described in the patent, close tolerances are required in the manufacture of the scale and particularly the load transfer linkage and suspension member connections. It is necessary not only that the torque transmitting members are torsionally rigid, but that the suspension members are vertical and that the axes of the load platform supporting suspension members are equally spaced at all points of suspension from the axes of the fulcrum suspension members attached to the support. Past efforts to control this spacing have included the use of torque tubes with the suspension members partially wrapped over the tube surfaces, with reliance on the tube diameters to control the spacing. In many applications, these efforts have been found unsatisfactory, particularly when the scales are subjected to shocks or overloading, due to high surface compressive stresses on the suspension members where in contact with the torque tubes. Under these stresses the cross sections of the suspension members are often subjected to distortions leading to loss of calibration, nonuniformity of response at the points of suspension, and sensitivity to the position of the load on the scale.

In scale structures of the type described in the above patent, where the suspension members are not in contact with the torque tubes but are attached to members secured on the tubes, improvements in the stability of calibration are obtainable only by means of close tolerances in the manufacture and assembly of the parts forming the load transfer linkage. This adds significantly to the cost of manufacture.

Accordingly, the principal object of this invention is to provide a load transfer linkage constructed to improve the stability of calibration of suspension scales reliant on the use of torque transfer members, and in particular the spacing of the vertically extending suspension members.

A second object is to achieve the desired stability of calibration by means of structures that are easily and relatively inexpensively fabricated and assembled.

The foregoing and other objects of the invention will become apparent from the following description.

BRIEF SUMMARY OF THE INVENTION

With the foregoing and other objects hereinafter appearing in view, the features of this invention include a load transfer linkage comprising a plurality of elongate, horizontal, torsionally rigid torque transmitting members, each member having a pair of calibrating sleeves received thereon, the sleeves having annular outer surfaces of predetermined uniform and equal outer diameters.

In one method of manufacture, a length of cylindrical tubing is fabricated of precisely constant outer diameter, then transversely cut into multiple sections. Each section is then assembled as a calibrating sleeve on a torque transmitting member of the scale. The suspension members of the scale are each suspended on a vertical axis located for minimal lateral bearing force on a surface of a sleeve, thus precisely controlling the length of the torque arm at each suspension point on the scale, and ensuring their equality at all points of suspension. The desired stability of calibration is maintained in use by avoiding distortions of the suspension members under shocks and overloading.

DETAILED DESCRIPTION

Figure 4:
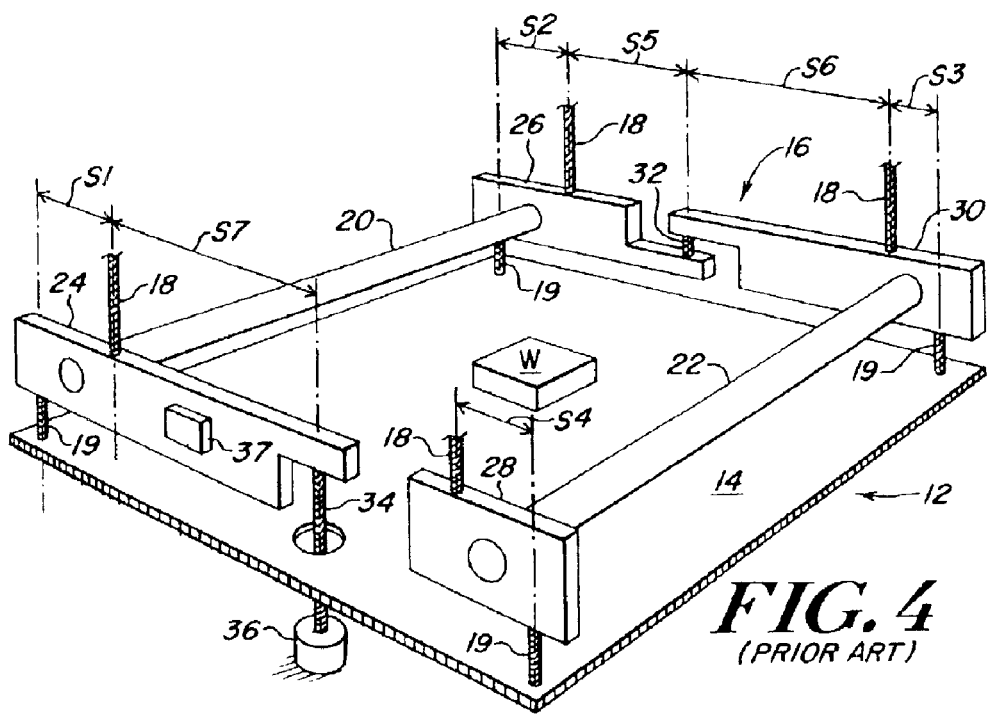
FIG. 4 is a partially diagrammatic illustration of the principal components of a first exemplary form of prior art cable suspension scale to which the invention is adapted.
Figure 5:
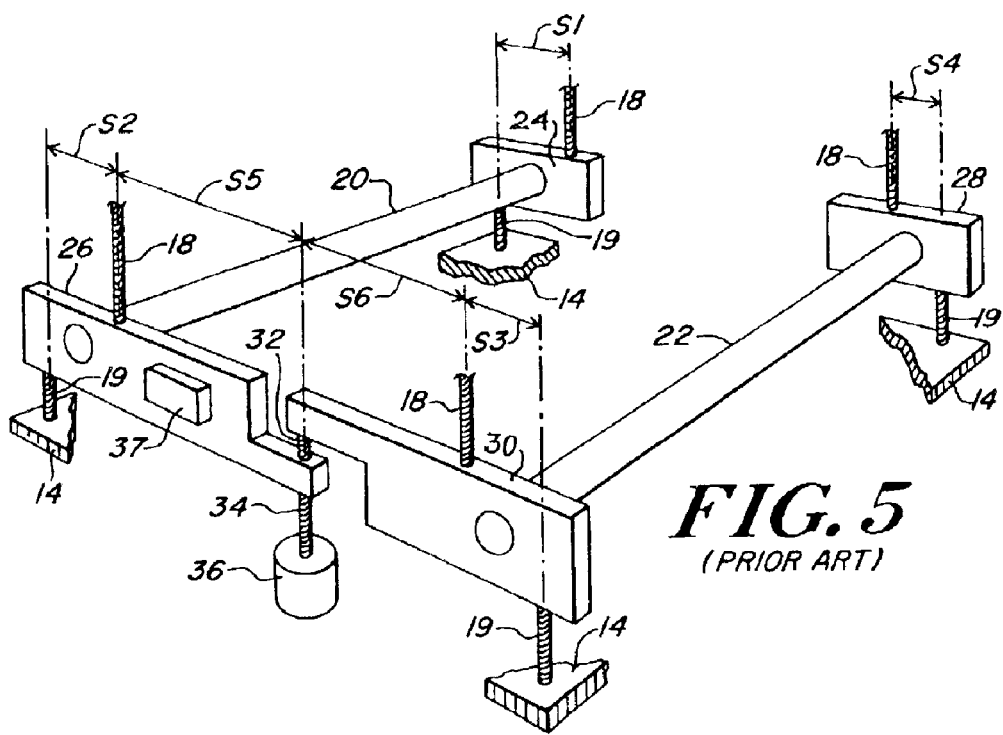
FIG. 5 is a partially diagrammatic illustration of a second exemplary form of prior art cable suspension scale to which the invention is adapted.

The improvements of the present invention are best understood in its application to prior art suspension scales of the general types illustrated in FIGS. 4 and 5 and will be apparent for well-known variants thereof. Referring to FIG. 4, a scale 12 comprises a load platform 14 and a load transfer linkage 16. The configurations of the parts are intended only for illustration of the operation of the scale and actually take well-known forms in practice. A weight W on the load platform may take any suitable form, and is shown in the above patent as a hopper fitted at the bottom with a valve, gate or volumetric feeding element which may be closed for loading a batch of particulate solid material and opened after weighing to discharge the batch.

The load transfer linkage 16 is suspended by a set of four freely vertically hanging, universally transversely flexible and relatively inextensible fulcrum suspension members 18, each secured at its upper end to a fixed support structure (not shown). Suspension members 19 which are also universally transversely flexible and relatively inextensible are fastened to parts of the transfer linkage 16, hang freely vertical and are attached at their lower ends to points on the load platform 14 herein referred to as points of suspension, thereby avoiding any appreciable spring or hysteresis effects, variations in mechanical advantage, or binding due to imperfect leveling. The term "relatively inextensible" as used herein is intended to mean that the element so characterized will not, under the maximum tensile strength which it will encounter within the design capability of the scale, including shock and overload, elongate more than a negligibly small fraction of the total length of said element. An example of such an element is a steel cable formed of wires twisted in ordinary rope formation.

The linkage 16 comprises horizontally extending, torsionally rigid torque transmitting members 20 and 22. Levers 24 and 26 are secured to the member 20 and levers 28 and 30 are secured to the member 22. The suspension members 18 and 19 are attached in pairs to the levers 24, 26, 28 and 30, and the vertical axes of each pair of suspension members are mutually spaced by torque arms or distances s1, s2, s3 and s4, thus imparting torques to the levers 24, 26, 28 and 30 about the fulcrums located at the fixed lower ends of the suspension members 18. The torques applied to the member 20 are directed counterclockwise as viewed in FIG. 4, and the torques applied to the member 22 are directed clockwise as viewed in that figure. A component of torque applied to the lever 24 equals the tension force on the suspension member 19 attached thereto multiplied by s1. A component of torque applied to the lever 26 equals the tension force on the suspension member 19 attached thereto multiplied by s2. A component of torque applied to the lever 30 equals the tension force on the suspension member 19 attached thereto multiplied by s3. A component of torque applied to the lever 28 equals the tension force on the suspension member 19 attached thereto multiplied by s4.

The levers 26 and 30 are torque equalizing levers and are connected by a vertically disposed suspension member 32 similar to the suspension members 18 and 19. The vertical axis of the suspension member 32 is located equal distances s5 and s6 from the vertical axes of two suspension members 18.

The lever 24 is elongate to provide a mechanical advantage as fully described in the above patent and extends to a vertical suspension member 34 which is attached at its lower end to a fixed load cell 36. The tension force on the suspension member 34 is sufficient to equal and counterbalance the total torque on the lever 24 which equals the sum of the torques applied and transferred thereto by all of the suspension members 19.

With the scale in balance, the sum of the torques applied directly to the member 22 by the suspension members 19 is applied as an upward force delivered through the suspension member 32 to the lever 26, and due to the equality of the distances s5 and s6 a torque equal to that sum is added to the counterclockwise torque on the member 20. Thus the tension on the suspension member 34 is proportional to the sum of the torques applied by all of the suspension members 19, and the load cell counterbalances the sum and indicates the total load on the scale.

In the drawing, a weight 37 attached to the lever 24 is shown to represent diagrammatically a removable test or counterbalance weight which is usually provided to counterbalance the tare weight of the load platform and empty hopper or other parts thereon.

FIG. 5 illustrates a known variant of the scale of FIG. 4 similar to that disclosed in the above patent, like elements of the respective embodiments having like reference numerals. In this embodiment the load cell 36 and suspension member 34 are located on the axis of the suspension member 32. In this case the tension force on the suspension member 34 is the sum of the upward forces applied by the levers 26 and 30, the distances s5 and s6 being equal as in the embodiment of FIG. 4.

Figure 3:
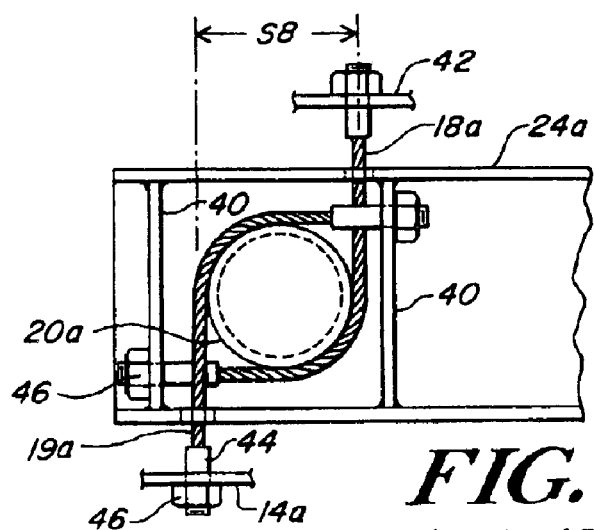
FIG. 3 is a partially fragmatic front elevation of a prior art scale.

Inspection of FIGS. 4 and 5 reveals the critical importance of the torque arms s1, s2, s3 and s4 being equal in order that the respective force contributions applied to the load transfer linkage by each of the suspension members 19 will be multiplied by the identical factor. In the embodiments schematically illustrated in these figures and in the above patent, the suspension members 18 and 19 are attached to the levers and the spacing of their respective vertical axes is dependent on the precision of manufacture of these parts. FIG. 3 illustrates another known means of attachment of the suspension members referred to as the "wrap-around" design. This figure illustrates one pair of suspension members 18a and 19a, and it will be understood that the pairs of suspension members at each of the other points of suspension are similarly attached.

A torsionally rigid, cylindrical torque transfer tube 20a is inserted through and welded in a circular hole in the web of an I-beam shaped lever 24a. Struts 40 are welded to the lever 24a and provided with holes for attachment of the suspension members 18a and 19a to the fixed support 42 and the load platform 14a, respectively. Each end of each suspension member is provided with a suitable fitting 44 swaged thereto and provided with a threaded end for attachment to a strut by a nut 46. The positions of attachment of the suspension members provide a substantial arc of contact, in this case 90°, between each suspension member and the surface of the torque tube member 20a. In theory, the outer diameter of the torque tube 20a is a component of the torque arm distance s8 between the vertical axes of the suspension members 18a and 19a. By constructing each scale with similar tubes such as 20a of uniform outer diameter, substantial equality of the torque arms s8 at each point of suspension is achieved. However, it has been observed that under shock and overload conditions, scales of the wrap-around design have exhibited nonuniform calibrations and variations in scale measurements for different locations on the scale of the center of gravity of the load mass. A study of these results has determined that they are caused by substantial surface compressive forces at the contacting surfaces of the torque tube members such as 20a. These forces, being laterally applied to the suspension members and torque tubes, result in distortions of the cross sections of the suspension members and/or the torque tubes, for example changing a circular cross section to an elliptical cross section. As a result, the torque arm distance s8, as viewed in FIG. 3, is slightly reduced at each of the pairs of suspension members 18a, 19a, and the corresponding torque arm distances at the other pair positions on the scale are also changed, frequently by different amounts, upsetting the equality of the torque arms upon which the accuracy of the scale depends.

Figure 1:
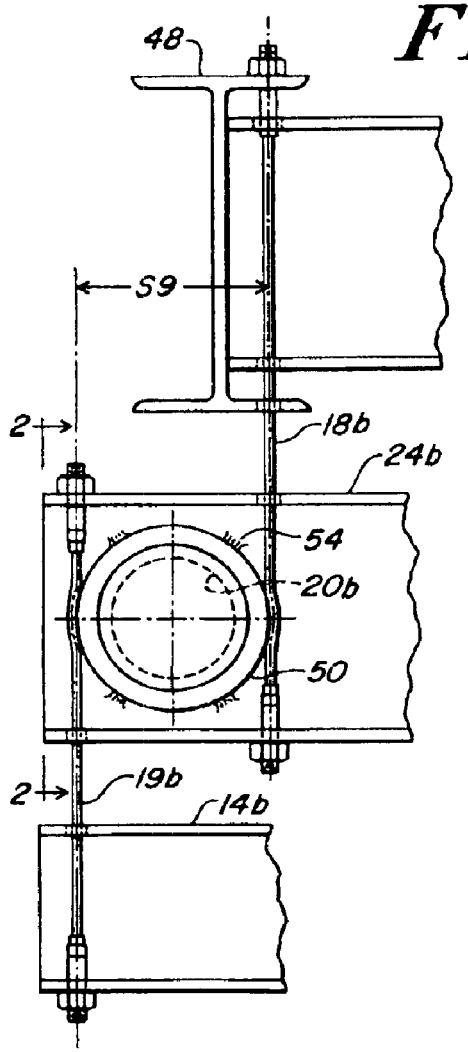
FIG. 1 is a partially fragmatic front elevation of a preferred embodiment of the invention as applied to a high load capacity scale.
Figure 2:
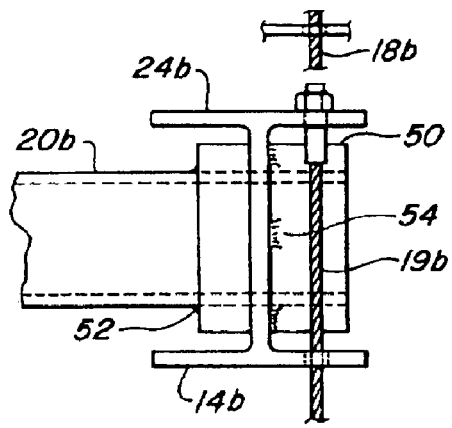
FIG. 2 is a partially fragmatic side elevation taken on line 2—2 of FIG. 1.

FIGS. 1 and 2 illustrate one form of large capacity scale constructed according to this invention which solves the problem of the wrap-around design illustrated by FIG. 3. Suspension members 18b and 19b are respectively attached to a fixed support 48 and the load platform frame 14b of a hopper for load material. The suspension members are respectively secured to the flanges of an I-beam shaped lever 24b such as the lever 24, 26, 28 or 30 of FIG. 4 or 5. A torsionally rigid, cylindrical torque tube 20b or a horizontally extending, torsionally rigid torque transfer member of any other desired shape, replaces one of the members 20 or 22 of FIGS. 4 or 5 and has a cylindrical calibrating sleeve 50 slidably or otherwise fitted to its end. The sleeve 50 may be spot welded or otherwise secured to the tube 20b by welds such as 52. The assembled tube 20b and sleeve 50 are inserted through a circular hole in the web of the lever beam 24b, the sleeve 50 being welded, for example by spot welds 54, to the lever 24b.

As shown in FIG. 1, the suspension members 18b and 19b are fastened to the flanges of the lever 24b at positions producing minimum lateral bearing forces between the suspension members and the surface of the sleeve 50, and except for extremely small distortions of the suspension members at the points of contact, the suspension members extend vertically from end to end. In accordance with this invention, a "minimum lateral bearing force" is a force which slightly spreads each of the paired suspension members 18b and 19b beyond its free vertical hanging position, only sufficiently to maintain mechanical contacts approaching point contacts between the suspension members and the sleeve surface, with minimum surface compressive stresses. Typically, this imparts less than one degree of change from the true vertical alignment of each suspension member.

For example, for a scale having five inches of free length of the suspension members from the connections with the fixed frame and the load platform to the points of bearing on the calibrating sleeve 50, the outer diameter of the sleeve 50 may be as small as one sixteenth inch greater than the minimum distance between the surfaces of the suspension members when hung on true vertical axes. This will produce a surface compressive force between each suspension member and the sleeve 50 of as little as 6.25 pounds under a load tension on the suspension members of 500 pounds.

The purpose of maintaining contact as described above is to maintain a distance s9 between the neutral axes of bending of the suspension members 18b and 19b which is exactly equal at all points of suspension on the scale. The dimensions of the torque transfer member 20b itself do not affect the distance s9 and close tolerance in the manufacture of this member is not required. The distance s9 is the sum of the outer diameter of the sleeve 50 and the distances from the bearing points on the sleeve to the neutral axes of bending of the respective suspension members. Therefore, the full benefits of the invention are achieved when the latter distances are equal at all points of suspension on the scale. For wire rope cables, for example, this requires that they have equal diameter at the bearing points.

According to a preferred method of manufacture, the sleeves 50 for each scale are fabricated by cutting sections from a single length of tubing stock manufactured to a predetermined, longitudinally uniform cross section and outer diameter, thus causing the torque arm distances corresponding to s9 at all points of suspension on the scale to be identical.

What is claimed is:

1. A suspension scale comprising, in combination, a frame and a load platform supported thereby, a plurality of elongate, torsionally rigid torque transfer members each extending horizontally between said frame and platform, mutually spaced calibrating sleeves of predetermined uniform and equal diameters received on each transfer member, a lever fixed to each transfer member and extending to and connected with the lever of another said member for transfer of torque therebetween, a pair of universally transversely flexible and relatively inextensible suspension members having diametrically opposing points of contact with each said sleeve and each having one end secured to the transfer member thereof, one of said pair being attached at the other end thereof to the frame and the other of said pair being attached at the other end thereof to the load platform, each suspension member extending from end to end on a substantially vertical axis with its said point of contact spaced from each end thereof, the spacing between the axes of each pair being substantially the minimum required to maintain mechanical contact thereof with the sleeve, and lever counterbalancing means connected with the levers of said transfer members and adapted to apply thereto and to indicate a force proportional to the sum of the torques applied by the load platform to said transfer members.

2. A suspension scale according to claim 1, in which the sleeves are of cylindrical shape.

3. A suspension scale according to claim 1, in which the calibrating sleeves are affixed to said transfer members.

4. A suspension scale according to claim 1, in which the transfer members and calibrating sleeves are of cylindrical shape and the sleeves are slidably fitted on the transfer members.

* * * * *